United States Patent
Xu et al.

(10) Patent No.: US 11,875,603 B2
(45) Date of Patent: Jan. 16, 2024

(54) FACIAL ACTION UNIT DETECTION

(71) Applicants: Hewlett-Packard Development Company, L.P., Spring, TX (US); Purdue Research Foundation, West Lafayette, IN (US)

(72) Inventors: Shaoyuan Xu, Palo Alto, CA (US); Qian Lin, Palo Alto, CA (US); Jan Allebach, Boise, ID (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 173 days.

(21) Appl. No.: 17/425,769

(22) PCT Filed: Apr. 30, 2019

(86) PCT No.: PCT/US2019/029832
§ 371 (c)(1),
(2) Date: Jul. 26, 2021

(87) PCT Pub. No.: WO2020/222785
PCT Pub. Date: Nov. 5, 2020

(65) Prior Publication Data
US 2022/0114838 A1    Apr. 14, 2022

(51) Int. Cl.
*G06V 40/16*   (2022.01)
*G06V 10/70*   (2022.01)
(Continued)

(52) U.S. Cl.
CPC ............ *G06V 40/175* (2022.01); *G06V 10/70* (2022.01); *G06V 10/761* (2022.01); *G06V 40/161* (2022.01); *G06V 40/165* (2022.01); *G06V 40/171* (2022.01); *G06V 40/176* (2022.01); *G06V 40/18* (2022.01)

(58) Field of Classification Search
CPC .... G06V 40/175; G06V 10/70; G06V 10/761; G06V 40/161; G06V 40/165; G06V 40/171; G06V 40/176; G06V 40/18; G06F 18/22
See application file for complete search history.

(56) References Cited

U.S. PATENT DOCUMENTS 10,198,845 B1 * 2/2019 Bhat .................... G06V 40/176
10,275,640 B2 * 4/2019 Seuss ................... G06V 40/171
(Continued)

OTHER PUBLICATIONS

Facial Point Annotations, i.Bug—Resources—Facial Point Annotations, Retrieved from the Internet on Mar. 19, 2019, 2 pages, https://ibug.doc.ic.ac.uk/resources/facial-point-annotations/.
(Continued)

*Primary Examiner* — Phuoc Tran
(74) *Attorney, Agent, or Firm* — Quarles & Brady LLP

(57) ABSTRACT

An example system includes a landmark engine to detect a facial landmark in an image of a face. The system includes a comparison engine to determine a difference between the facial landmark in the image and a facial landmark of a neutral face. The system also includes an action engine to determine whether a facial action unit occurred based on whether the difference satisfies a condition.

12 Claims, 7 Drawing Sheets

(51) Int. Cl.
*G06V 40/18* (2022.01)
*G06V 10/74* (2022.01)

(56) References Cited

U.S. PATENT DOCUMENTS

| | | | |
|---|---|---|---|
| 10,380,414 B2* | 8/2019 | Yao | G06V 40/176 |
| 10,572,720 B2* | 2/2020 | Hu | G06T 17/00 |
| 10,628,741 B2* | 4/2020 | El Kaliouby | G06F 18/25 |
| 2003/0133599 A1* | 7/2003 | Tian | G06V 40/175 |
| | | | 382/118 |
| 2014/0242560 A1 | 8/2014 | Movellan et al. | |
| 2015/0157259 A1 | 6/2015 | Bradu | |
| 2015/0269424 A1 | 9/2015 | Bacivarov et al. | |
| 2016/0328875 A1 | 11/2016 | Fang et al. | |
| 2017/0098122 A1 | 4/2017 | El Kaliouby et al. | |
| 2017/0116467 A1 | 4/2017 | Li et al. | |
| 2017/0206694 A1 | 7/2017 | Jiao et al. | |
| 2017/0286759 A1 | 10/2017 | Yao et al. | |
| 2018/0330152 A1* | 11/2018 | Mittelstaedt | G06V 40/174 |
| 2019/0333262 A1* | 10/2019 | Chen | G06V 40/172 |
| 2023/0110916 A1* | 4/2023 | Krokhalev | G06T 13/40 |
| | | | 345/473 |

OTHER PUBLICATIONS

FACS—Facial Action Coding System, Retrieved from the Internet on Mar. 19, 2019, 5 pages, https://www.cs.cmu.edu/~face/facs.htm.

Humintell.com, The Seven Basic Emotions: Do you know them?, Retrieved from the Internet on Mar. 19, 2019, 6 pages, https://www.humintell.com/2010/06/the-seven-basic-emotions-do-you-know-them/.

IMotions, Facial Action Coding System (FACS)—A Visual Guidebook, Feb. 18, 2019, Retrieved from the Internet on Mar. 19, 2019, 18 pages, https://imotions.com/blog/facial-action-coding-system/.

Wikipedia, Wikimedia Foundation, Facial Action Coding System, Mar. 19, 2019, 9 pages, https://en.wikipedia.org/wiki/Facial_Action_Coding_System.

\* cited by examiner

FIG. 7

FACIAL ACTION UNIT DETECTION

BACKGROUND

Humans engage in verbal and nonverbal communication. The nonverbal communication may include facial expressions. For example, people may smile to express happiness, frown to express sadness, or the like. People may also wink, raise eye brows, or the like to communicate. People may even communicate through the use of involuntary facial expressions.

BRIEF DESCRIPTION OF THE DRAWINGS

FIG. 7 is a diagram of an example set of landmarks for an example face.

DETAILED DESCRIPTION

The information contained in facial expressions may be very useful. For example, the facial expression may indicate an emotional state of that person. The facial expression may supplement or even entirely change the meaning of a verbal communication received from the person. The facial expression may indicate an amount of pain being experienced by the person or a mental condition of the person (e.g., whether the person is suffering from a mental disorder or a disease that affects the brain). The facial expression may indicate whether the person is lying. Thus, a facial expression may be used by an autonomous system or a business to determine an emotional state of a person interacting with the autonomous system or the business. Medical facilities may use a facial expression to determine the amount of pain being experienced by a patient or to diagnose the patient. Law enforcement may use a facial expression to determine the truthfulness of suspects or witnesses.

Facial expressions may be made up of facial action units. As used herein, the term "facial action unit" refers to the movement of a facial muscle that produces a change in facial appearance. In an example, the facial action units may be classified according to the Facial Action Coding System, which is a taxonomy of facial action units according to the change in facial appearance that is produced. The facial expression of the user may be determined by detecting which facial action units have occurred.

A machine-learning model may be used to determine whether a facial action unit has occurred. For example, the machine-learning model may be trained using a set of images labeled with whether or not the facial action unit has occurred in each image. However, the machine-learning model may be computationally expensive. The machine-learning model may use large amounts of computational resources during training or operation. The machine-learning model may also, or instead, take a significant amount of time to determine whether the facial action unit has occurred. Additionally, the training set may be limited in size. So, the machine-learning model may be inaccurate. For example, the machine-learning model may provide inaccurate results when exposed to new faces not included in the original training set. Detection of facial action units and detection of facial expression could be improved by a computationally efficient and accurate way of determining whether a facial action unit has occurred.

Figure 1:
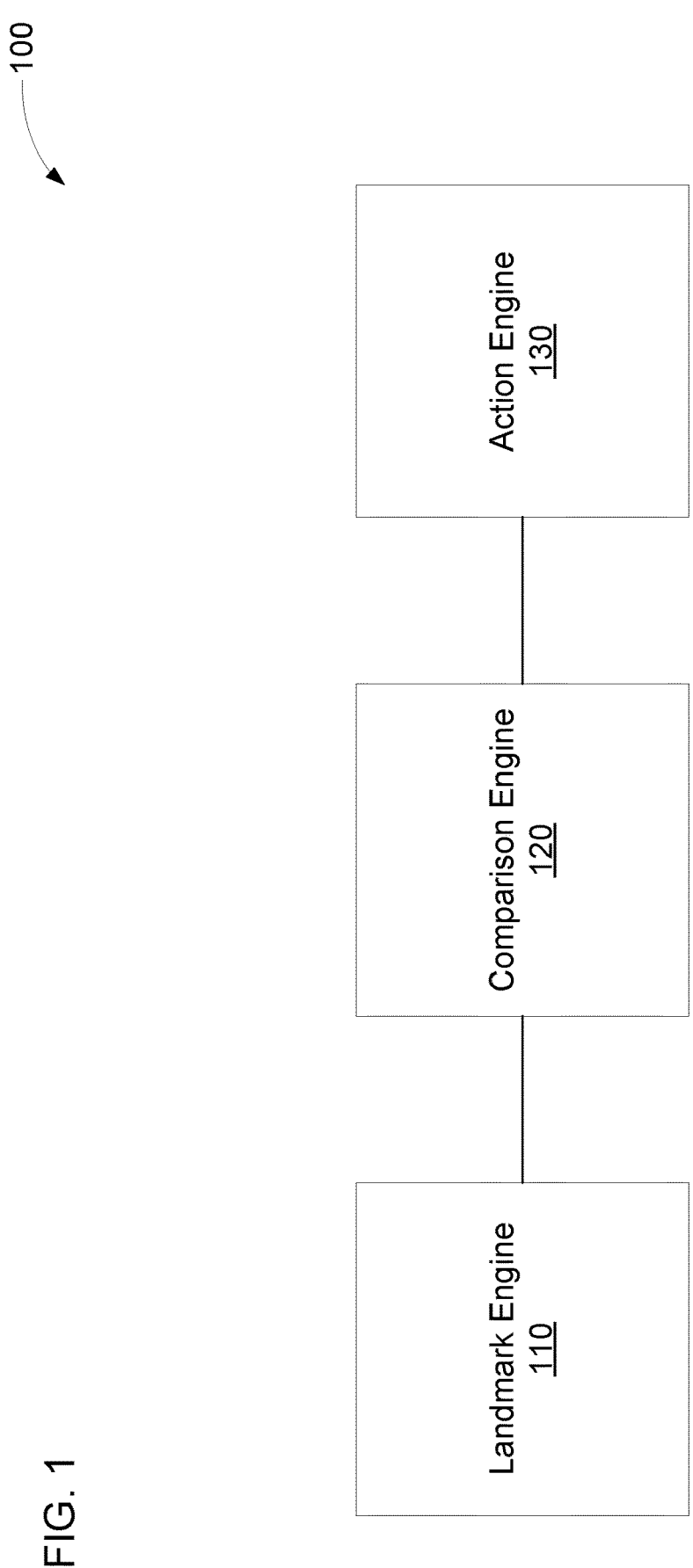
FIG. 1 is a block diagram of an example system to determine whether a facial action unit has occurred.

FIG. 1 is a block diagram of an example system 100 to determine whether a facial action unit has occurred. The system 100 may include a landmark engine 110. As used herein, the term "engine" refers to hardware (e.g., analog or digital circuitry, a processor, such as an integrated circuit, or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random-access memory (RAM), a hard-disk or solid-state drive, resistive memory, or optical media such as a digital versatile disc (DVD), and/or executed or interpreted by a processor), or hardware and software hosted at hardware. The landmark engine 110 may determine a facial landmark in an image of a face. As used herein, the terms "determining a facial landmark" or "identifying a facial landmark" refer to determining or identifying a location of that facial landmark. The facial landmarks may correspond to body parts of the face, such as eye brows, eyes, nose, mouth, facial contour, or the like. There may be multiple facial landmarks for each body part. For example, a plurality of landmarks may circumscribe each body part. The plurality of landmarks may correspond to predetermined body parts, so the landmark engine 110 may determine the location of the landmark by determining the location of that body part in the image of the face.

The system 100 may include a comparison engine 120. The comparison engine 120 may determine a difference between the facial landmark for the image and a facial landmark of a neutral face. As used herein, the term "neutral face" refers to a face that has no facial action units that are active. For example, the neutral face may be from the same person as the face in the image. The comparison engine 120 may select a facial landmark in an image of the neutral face that corresponds to the landmark for the image of the face. The comparison engine 120 may compare the corresponding facial landmarks to determine the difference between them.

The system 100 may include an action engine 130. The action engine 130 may determine whether a facial action unit occurred based on whether the difference satisfies a condition. For example, the action engine 130 may determine whether the difference is consistent with the occurrence of the facial action unit. Based on the difference being consistent with the occurrence of the facial action unit, the action engine 130 may determine that the facial action unit occurred.

Figure 2:
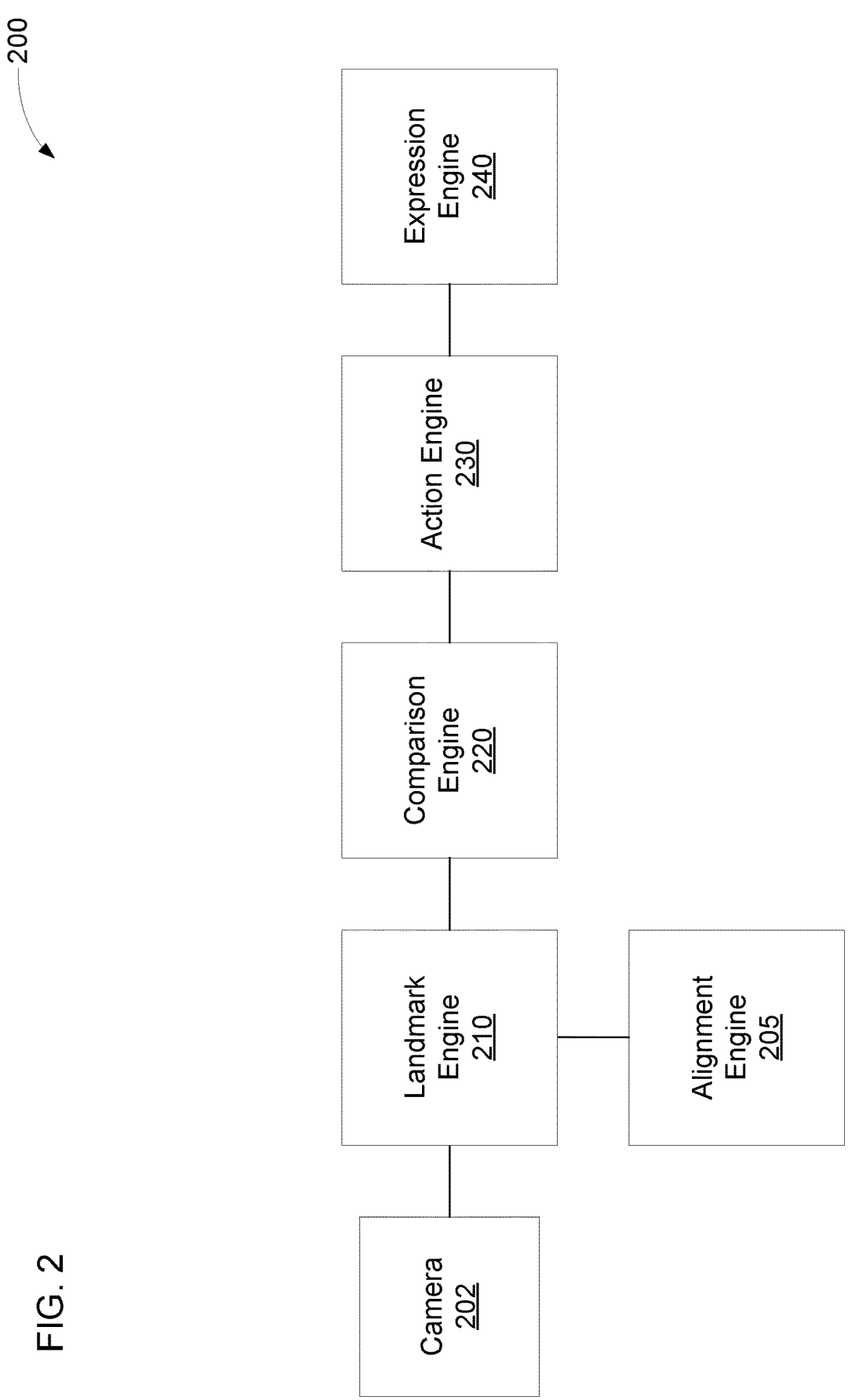
FIG. 2 is a block diagram of another example system to determine whether a facial action unit has occurred.
Figure 7:
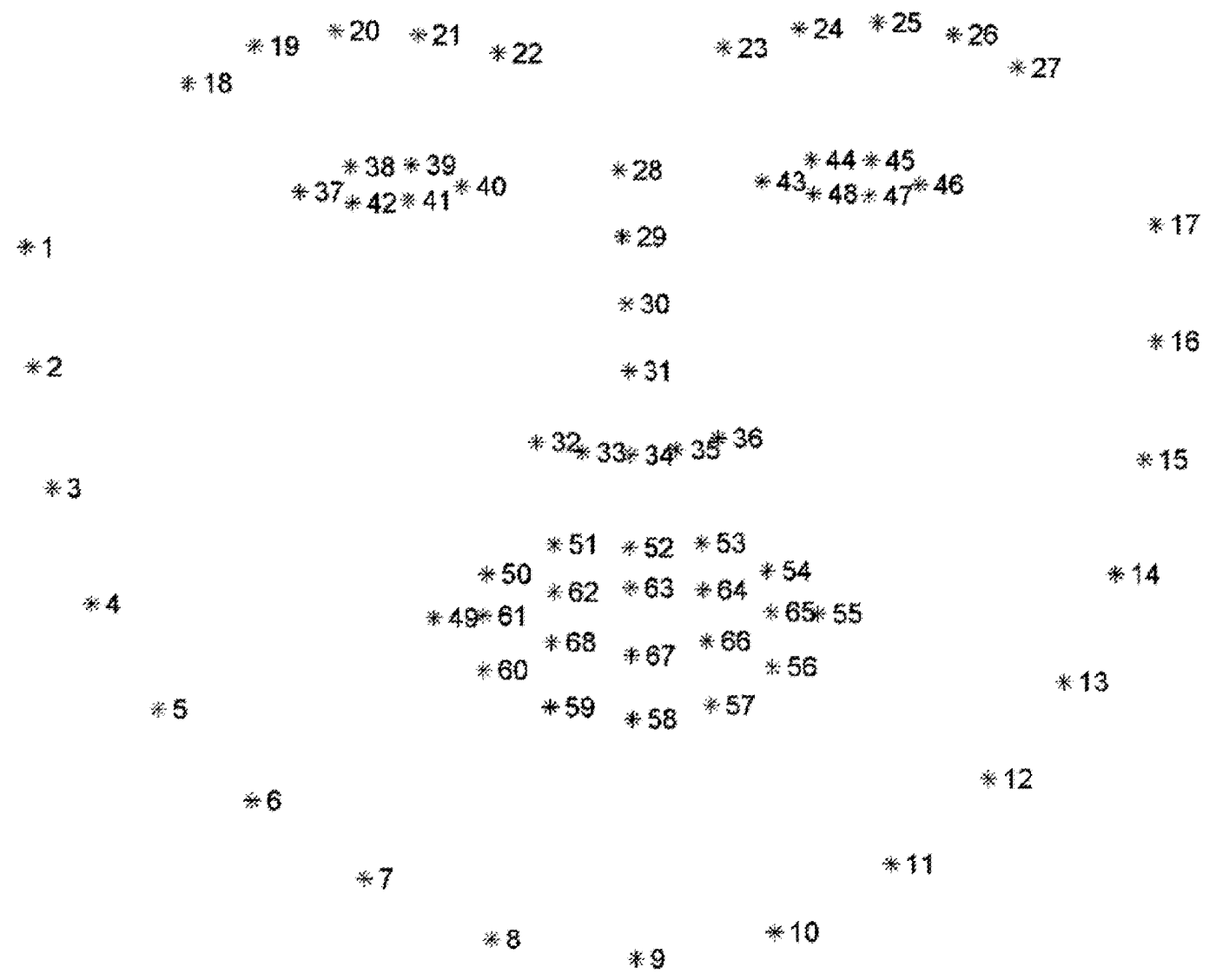

FIG. 2 is a block diagram of another example system 200 to determine whether a facial action unit has occurred. The system 200 may include a camera 202 to capture an initial image of a face. The system 200 may include a landmark engine 210. The landmark engine 210 may determine a facial landmark for the initial image of the face. The landmark engine 210 may detect the locations of body parts in the image (e.g., eyes, eyebrows, nose, mouth, jawline, etc.) and determine landmark locations based on the locations of the detected body parts. In some examples, the landmark engine 210 may initially detect the face in the initial image and determine the plurality of facial landmarks based on the detected face. In an example, the landmark engine 210 may include a machine-learning model to receive the initial image as an input and determine the locations of the landmarks based on the input image. The landmark engine 210 may determine the locations as cartesian coordinates, for example, relative to the boundaries or a point on the boundary of the image. FIG. 7 is a diagram of an example set of landmarks for an example face. Other sets of landmarks may also be used. The landmarks in the example set of landmarks may be identified based on the number indicated in the figure. For example, the landmark at the bottom of the chin may be referred to as LM 9.

The system 200 may include an alignment engine 205. The alignment engine 205 may generate the image of the face by cropping an initial image of the face. The alignment engine 205 may select a size or an alignment of the face in the image based on a size or an alignment of a neutral face. For example, the alignment engine 205 may resize, rotate, or position the face in the image to be the same as the size and alignment of the neutral face in an image of the neutral face. Resizing the face in the image may include cropping the image, magnifying or shrinking the image, or the like. Selecting the size and alignment to be the same may cause corresponding landmarks between the face and neutral face to be in similar positions in the images.

The alignment engine 205 may determine a distance in the initial image of the face and resize the face in the image based on the distance. The distance may be between particular points in the initial image. For example, the landmark engine 210 may determine the location of landmarks in the initial image. The alignment engine 205 may determine the distance between the landmarks. In an example, the alignment engine 205 may determine the particular points based on a plurality of landmarks and determine the distance between the determined points. For example, the alignment engine 205 may determine the distance between eye centers, the distance between the landmarks on the outer edge of each eye (e.g., LM 37 and LM 46), the vertical distance between the eye centers and the chin (e.g., the difference in a y-coordinate between LM 9 and the eye centers), or the like. The locations of the eye centers may be determined by averaging the landmarks around the eye (e.g., LM 37, LM 38, LM 39, LM 40, LM 41, and LM 42 for the face's right eye).

The alignment engine 205 may resize the face by causing the height or width of the image to be a predetermined multiple of the determined distance. For example, the image may be cropped and scaled so that the height of the image is 1.5 times the vertical distance from the eye center to the chin. The alignment engine 205 may resize the face so that the determined distance is the same as or a predetermined multiple of a corresponding distance in the image of the neutral face. For example, the initial image may be cropped and scaled so that the distance between eye centers is the same for the image of the face and the image of the neutral face and so that both images have the same number of pixels. The aspect ratio of the image may be maintained, so the alignment engine 205 may determine the size by which to adjust one of the height or the width and adjust the other of the height or the width accordingly.

The alignment engine 205 may select the position of the face in the image based on a particular point in the initial image. For example, the particular point may be a landmark, a point derived from a landmark, or the like. The alignment engine 205 may select the position of the face in the image so that the particular point is in the same position in the image of the face and in the image of the neutral face (e.g., the eye centers are in the same locations). The alignment engine 205 may select the position so that the point is in a predetermined location (e.g., relative to the boundary of the image, a point on the boundary, etc.), may select the position so that the point is in a location determined based on the image of the neutral face (e.g., based on the position of the point in the image of the neutral face), or the like. In an example, the alignment engine 205 may select the position of the face by determining where to crop the initial image so that the face is in the selected position in the image.

The alignment engine 205 may select a rotation of the face in the image based on a particular point in the initial image. The alignment engine 205 may rotate the face so that the particular point is in the same position in the image of the face and in the image of the neutral face, in a predetermined location, or the like. In an example, the alignment engine 205 may use a plurality of points (e.g., the eye centers) to determine the rotation. For example, the alignment engine 205 may rotate the face so that the eye centers are on the same horizontal level (e.g., have a same vertical cartesian coordinate), so that the eye centers define a line having the same angle as a line defined by eye centers in the image of the neutral face, or the like. The alignment engine 205 may rotate the face by rotating the initial image of the face. In some examples, the alignment engine 205 may use the same two points to resize the face, translationally position the face, and rotationally position the face.

In an example, the alignment engine 205 may determine the locations of the eye centers in the image of the neutral face. The alignment engine 205 may rotate the image of the neutral face so the eye centers are on the same horizontal level. The alignment engine 205 may resize or position the neutral face based on the locations of the eye centers. The alignment engine 205 may rotate, resize, and position the face in the initial image to have the same alignment, sizing, and position as the neutral face. The alignment engine 205 may rotate the initial image so the eye centers are on the same horizontal level, resize the initial image so the eye center distance for the face is the same as the eye center distance for the neutral face, and position the eye centers so that the eye center locations for the face are the same as the eye center locations for the neutral face. For a particular subject, the locations of the eye centers relative to the rest of the face may be the same across images containing different facial expressions, so adjusting the images based on the locations of the eye centers may ensure the same orientation, position, and scale for the face across the images.

In an example, the landmark engine 210 may determine the landmarks in the initial image of the face to allow the alignment engine 205 to generate the image of the face from the initial image. However, the landmark coordinates may not be the same in the initial image and the image generated by the alignment engine 205 due to the change in size or alignment from the initial image to the image. Accordingly, the landmark engine 210 may determine the location of the landmarks in the image generated by the alignment engine 205. The landmark engine 210 determine the landmarks anew based on the image, may determine the change in location of the landmark based on the changes in the size or alignment and adjust the landmarks accordingly, or the like.

The system 200 may include a comparison engine 220. The comparison engine 220 may determine a difference between the facial landmark for the image and a facial landmark of a neutral face. For example, the comparison engine 220 may determine the difference in the position of the facial landmarks for each image (e.g., the distance the landmark has moved between images), the difference between the distances between particular landmarks in each image (e.g., the amount the distance has changed between images), or the like. The neutral face may be from the same person as the face in the image, but the neutral face may contain a neutral expression.

The comparison engine 220 may determine a relative difference between the facial landmark for the image and the facial landmark of the neutral face. The comparison engine 220 compute the relative difference based on a raw difference and a reference distance. The raw difference may be the previously discussed difference. The reference distance may be from the neutral face or the face. The reference distance may be a distance between particular points in the image of the face or the image of the neutral face. For example, the reference distance may be the distance between eye centers, the distance between the landmarks on the outer edge of each eye (e.g., LM 37 and LM 46), the vertical distance between the eye centers and the chin (e.g., the difference in a y-coordinate between LM 9 and the eye centers), or the like. The reference distance may be the same as the distance used by the alignment engine 205 to size the image of the face or may be a different distance. The comparison engine 220 may compute the relative difference by dividing the raw difference by the reference distance.

In some examples, the comparison engine 220 may select the image of the neutral face by selecting a neutral face corresponding to the face in the image. For example, the camera 202 may capture a video that includes a plurality of images of the face, and the comparison engine 220 may select one of the plurality of images as the image of the neutral face. The comparison engine 220 may evaluate images for neutrality, average multiple images or landmark positions, or the like to select the image of the neutral face. In an example, the comparison engine 220 may identify the face in the image and retrieve the neutral image of the face based on the identity of the face.

The system 200 may include an action engine 230. The action engine 230 may determine whether a facial action unit occurred based on whether the difference satisfies a condition. For example, the action engine 230 may determine whether the difference (e.g., the relative difference) exceeds a threshold to determine whether the facial action unit occurred. Each facial action unit may have a corresponding threshold, there may be a single threshold for all facial action units, or there may be a combination of shared and unique thresholds. The threshold may be a predetermined threshold. Table 1 includes examples of positions or distances and thresholds for particular facial action units. Other examples may include other positions or distances or other facial action units.

TABLE 1

| Facial Action Unit Number | Description | Muscle | Position/Distance and Threshold |
|---|---|---|---|
| 1 | Inner Brow Raiser | Frontalis, pars medialis | Vertical distance between LM 18 and 22 or LM 27 and 23 increases more than threshold |
| 2 | Outer Brow Raiser | Frontalis, pars lateralis | Position of LM 19, 20, 25, or 26 moves upward more than threshold |
| 4 | Brow Lowerer | Depressor Glabellae, Depressor Supercilli, Currugator | Distance between LM 18 and 22 or LM 27 and 23 decreases more than threshold and position of LM 49, 51, 53, or 55 does not move upward more than threshold |
| 5 | Upper Lid Raiser | Levator palpebrae superioris | Vertical distance between LM 38 and 42, LM 39 and 41, LM 44 and 48, or LM 45 and 47 increases more than threshold |
| 6 | Cheek Raiser | Orbicularis oculi, pars orbitalis | Vertical distance between LM 38 and 42, LM 39 and 41, LM 44 and 48, LM 45 and 47, LM 49 and 51, or LM 53 and 55 decreases more than threshold |
| 7 | Lid Tightener | Orbicularis oculi, pars palpebralis | Vertical distance between LM 38 and 42, LM 39 and 41, LM 44 and 48, or LM 45 and 47 decreases more than threshold, vertical distance between LM 49 and 51, or LM 53 and 55 does not decrease more than threshold, distance between LM 22 and 28 or LM 23 and 28 does not decrease more than threshold, and vertical distance between LM 18 and 22 or LM 27 and 23 does not become negative |

TABLE 1-continued

| Facial Action Unit Number | Description | Muscle | Position/Distance and Threshold |
|---|---|---|---|
| 9 | Nose Wrinkler | Levator labii superioris alaquae nasi | Distance between LM 22 and 28 or LM 23 and 28 decreases more than threshold, vertical distance between LM 18 and 22 or LM 27 and 23 becomes negative, and position of LM 49, 51, 53, or 55 moves upward more than threshold |
| 12 | Lip Corner Puller | Zygomaticus Major | Vertical distance between LM 49 and 51, or LM 53 and 55 decreases more than threshold, vertical distance between LM 38 and 42, LM 39 and 41, LM 44 and 48, or LM 45 and 47 does not decrease more than threshold, and horizontal distance between LM 61 and 65 or LM 49 and 55 does not increase more than threshold |
| 15 | Lip Corner Depressor | Depressor anguli oris (i.e., Triangularis) | Vertical distance between LM 49 and 58 or LM 55 and 58 decreases more than threshold, distance between LM 62 and 68, LM 63 and 67, or LM 64 and 66 does not increase more than threshold, and horizontal distance between LM 61 and 65 or LM 49 and 55 does not increase more than threshold |
| 16 | Lower Lip Depressor | Depressor labii inferioris | Distance between LM 62 and 68, LM 63 and 67, or LM 64 and 66 increases more than threshold and position of LM 9 does not move upward more than threshold |
| 20 | Lip Stretcher | Risorius with platysma | Horizontal distance between LM 61 and 65 or LM 49 and 55 increases more than threshold |
| 23 | Lip Tightener | Orbicularis oris | Vertical distance between LM 51 and 62 or LM 53 and 64 decreases more than threshold |
| 26 | Jaw Drop | Masetter, Relaxed Temporalis and Internal Pterygoid | Distance between LM 62 and 68, LM 63 and 67, or LM 64 and 66 increases more than threshold, position of LM 9 moves upward more than threshold, and vertical distance between LM 49 and 58 or LM 55 and 58 does not decrease more than threshold |

The system 200 may include an expression engine 240. The expression engine 240 may determine an expression of the face based on whether the action engine 230 has determined that a particular plurality of facial action units have occurred. For example, the expression engine 240 may determine an emotion, an amount of pain, a mental condition, a truthfulness, or the like of the target face based on the plurality of facial action units. Table 2 includes examples of sets of facial action units actuated for particular emotions. Other examples may include other facial action units or other emotions.

TABLE 2

| Emotion | Facial Action Units Activated |
|---|---|
| Happiness | 6 and 12 |
| Sadness | 1, 4, and 15 |
| Surprise | 1, 2, 5, and 26 |
| Fear | 1, 2, 4, 5, 7, 20, and 26 |
| Anger | 4, 5, 7, and 23 |
| Disgust | 9, 15, and 16 |
| Contempt | 12 and 14 |

In some examples, the action engine 230 or the expression engine 240 may include a machine-learning model to determine the expression of the face, such as a support vector machine, a neural network, or the like. The machine-learning model may determine the expression based on the difference determined by the comparison engine 220. In an example, the action engine 230 may determine whether the difference exceeds the threshold. The action engine 230 may provide the difference to the machine-learning model based on the threshold being exceeded and not provide the difference based on the threshold not being exceeded (e.g., provide a value of zero). Accordingly, differences may be provided for facial action units that are activated but not for facial action units that are not activated. A threshold for whether to provide the difference to a machine-learning model may be lower than a threshold used in an example without a machine-learning model. In an example, the difference may be provided to the machine-learning model regardless of whether the difference exceeds the threshold. The difference may not be compared to the threshold. For example, the action engine 230 may include the machine-learning model and may determine whether the facial action unit occurred by using the machine-learning model to determine the expression of the face based on the difference. The parameters of the machine-learning model may define the condition for deciding whether the facial action unit occurred.

The system 200 may accurately determine whether a facial action unit is occurring. For example, because the system 200 compares the image of the face to the image of the neutral face, the system 200 may provide accurate results even when receiving new faces. The system 200 may omit a machine-learning model or may include a machine-learning model with few inputs relative to a machine-learning model that operates directly on images of faces. Accordingly, the system 200 may be trained with few computational resources (if training is performed at all) using a small training set, and the system 200 may use few computational resources during operation.

Figure 3:
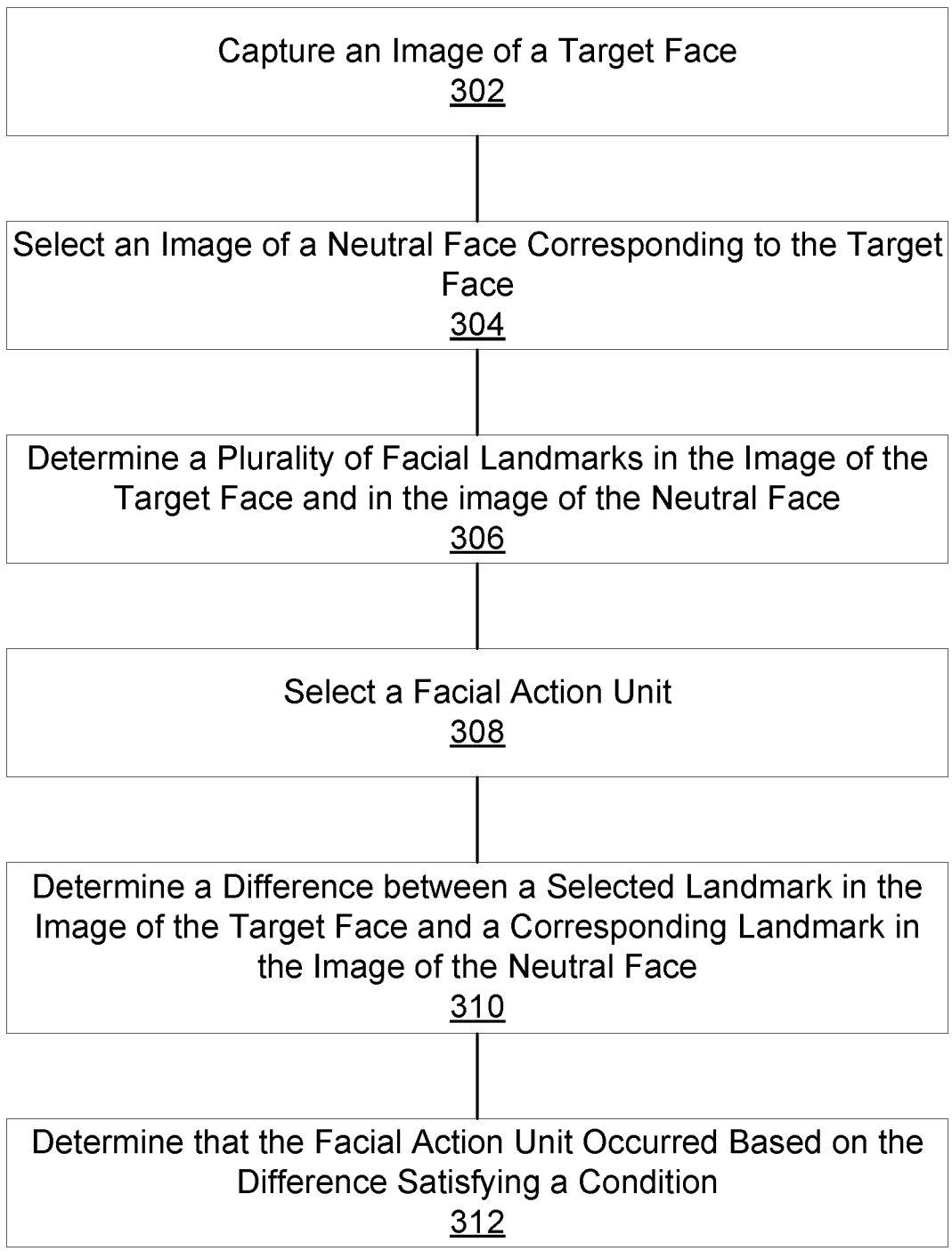
FIG. 3 is a flow diagram of an example method to determine whether a facial action unit has occurred.

FIG. 3 is a flow diagram of an example method 300 to determine whether a facial action unit has occurred. A processor may perform elements of the method 300. At block 302, the method 300 may include capturing an image of a target face. For example, a camera may capture the image of the target face. Block 304 may include selecting an image of a neutral face corresponding to the target face. The neutral face may be a face from the same person as the target face and that includes a resting expression or emotion (e.g., a lack of any other expression or emotion).

Block 306 may include determining a plurality of facial landmarks in the image of the target face and a plurality of facial landmarks in the image of the neutral face. Determining the landmarks may include identifying locations for the landmarks. For example, the location of body parts may be identified in the image of the target face or the image of the neutral face, and the locations of the landmarks may be identified based on the locations of the body parts.

At block 308, the method 300 may include selecting a facial action unit. Selecting the facial action unit may include selecting a facial action unit for which the target face will be analyzed to determine whether it is occurring. For example, the facial action units may be evaluated in a predetermined order, may be selected based on a particular expression that is being detected, or the like. Block 310 may include determining a difference between a selected landmark from the plurality of facial landmarks in the image of the target face and a corresponding landmark from the plurality of landmarks in the image of the neutral face. Movement of the selected landmark may be associated with the facial action unit. The difference may be a difference in the position of the selected landmark, a difference in the distance between the selected landmark and another landmark, or the like.

At block 312, the method 300 may include determining that the facial action unit occurred based on the difference satisfying a condition. Determining that the facial action unit occurred may include comparing the difference to a threshold, evaluating a plurality of differences with a machine learning model to determine that an expression that includes the facial action unit occurred, or the like. Referring to FIG. 2, in an example, the camera 202 may perform block 302, the comparison engine 220 may perform blocks 304, 308, or 310, the landmark engine 210 may perform block 306, and the action engine 230 may perform block 312.

Figure 4:
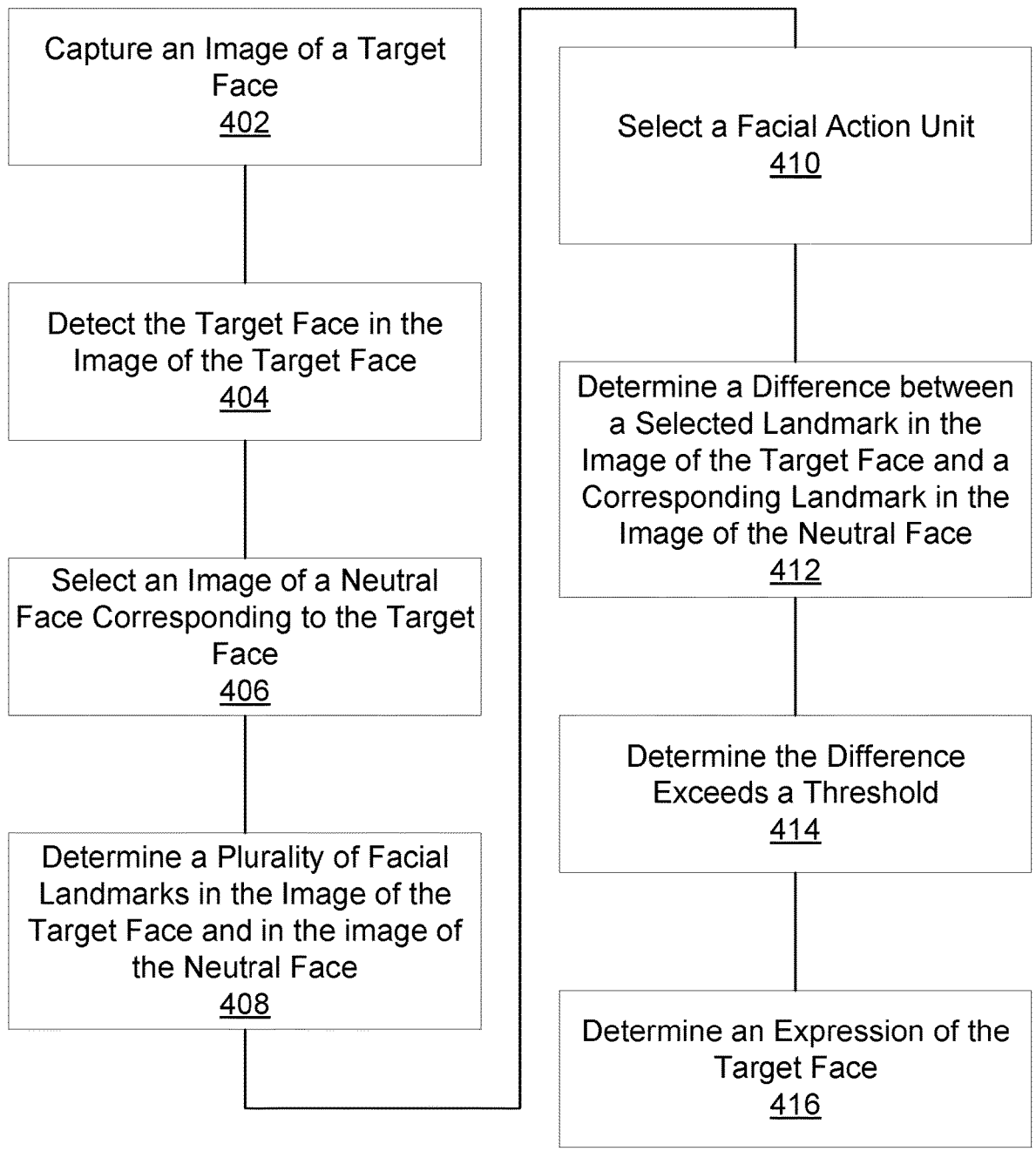
FIG. 4 is a flow diagram of another example method to determine whether a facial action unit has occurred.

FIG. 4 is a flow diagram of another example method to determine whether a facial action unit has occurred. A processor may perform elements of the method 400. At block 402, the method 400 may include capturing an image of a target face. For example, the image may be captured by a camera. The image may be a still image or a frame in a video captured by the camera. Block 404 may include detecting the target face in the image of the target face. Detecting the target face may include detecting whether a face is present in the image, detecting a location of the target face in the image, or the like. Thus, the detecting may be performed to determine whether there is a face to be analyzed, to determine how to crop, size, or align the image of the target face, or the like.

At block 406, the method 400 may include selecting an image of a neutral face corresponding to the target face. For example, the selecting the image of the neutral face may include identifying the face (e.g., based on facial landmarks) and retrieving the image of the neutral face from a database or server. Selecting the image of the neutral face may include selecting another frame of a video that includes a neutral face. For example, the neutrality of the face may be evaluated based on facial landmarks.

Block 408 may include determining a plurality of facial landmarks in the image of the target face and a plurality of facial landmarks in the image of the neutral face. A machine learning model may be used to determine the facial landmarks in each image. The determining of the facial landmarks may be based on the detecting of the target face. For example, the image of the target face may be sized or aligned based on the detecting. The determining of the facial landmarks may be based on the image of the target face that has been sized or aligned based on the detecting.

At block 410, the method 400 may include selecting a facial action unit. In an example, each of a plurality of facial action units may be evaluated to determine whether each one is occurring. Selecting the facial action unit may include determining which of the plurality of facial action units is being evaluated in this particular performance of the method 400. Other facial action units may be evaluated serially or in parallel with the selected facial action unit. Block 412 may include determining a difference between a selected landmark from the plurality of facial landmarks in the image of the target face and a corresponding landmark from the plurality of landmarks in the image of the neutral face. Movement of the selected landmark may be associated with the facial action unit. For example, the landmark may move or may not move when the facial action unit occurs. Table 1 includes examples of landmarks and movements that may occur for various facial action units. Determining the difference may include determining a difference included in Table 1.

At block 414, the method 400 may include determining the facial action unit occurred based on determining the difference exceeds a threshold. For example, it may be determined that the facial action unit occurred based on the difference exceeding the threshold as a sole condition, in combination with other conditions being satisfied, or the like. Table 1 includes examples of thresholds or conditions that may be evaluated to determine whether the facial action unit occurred.

Block 416 may include determining an expression of the target face based on the determining that the facial action unit occurred. For example, the expression may be an emotion, an amount of pain, a mental condition, a truthfulness of the target face, or the like. Determining the expression may include determining whether a particular combination of facial action units have occurred. Determining the expression may include determining the combination occurred without any other facial action units occurring, at least the combination occurred with possibly some additional facial action units occurring, or the like. Table 2 includes examples of combinations of facial action units that may occur for particular emotions. Determining the expression may include determining the expression with a machine-learning model, for example, based on the difference and whether the difference exceeded the threshold. In an example, the camera 202 of FIG. 2 may perform block 402, the landmark engine 210 may perform block 404 or 408, the comparison engine 220 may perform block 406, 410, or 412, the action engine 230 may perform block 414, and the expression engine 240 may perform block 416.

Figure 5:
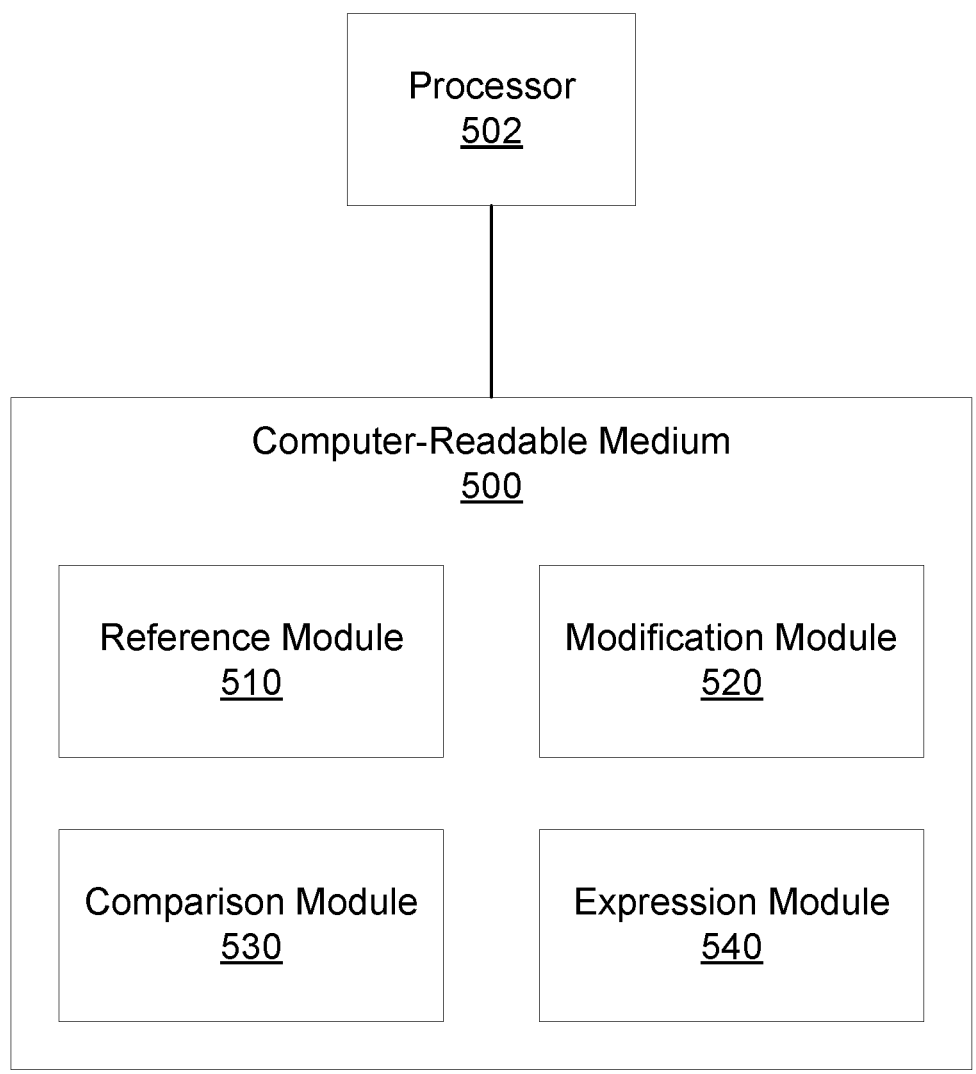
FIG. 5 is a block diagram of an example computer-readable medium including instructions that cause a processor to determine whether a facial action unit has occurred.

FIG. 5 is a block diagram of an example computer-readable medium 500 including instructions that, when executed by a processor 502, cause the processor 502 to determine whether a facial action unit has occurred. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc.

The computer-readable medium 500 may include a reference module 510. As used herein, a "module" (in some examples referred to as a "software module") is a set of instructions that when executed or interpreted by a processor or stored at a processor-readable medium realizes a component or performs a method. The reference module 510 may include instructions that, when executed, cause the processor 502 to determine a first distance in an image of a target face. For example, the reference module 510 may cause the processor 502 to determine the first distance based on locations of particular points in the image of the target face. The computer-readable medium 500 may include a modification module 520. The modification module 520 may cause the processor 502 to modify the image of the target face based on the first distance to create a modified image of the target face. For example, the modification module 520 may cause the processor 502 to crop, size, or align the image to create the modified image.

The computer-readable medium 500 may include a comparison module 530. The comparison module 530 may cause the processor 502 to determine a difference between a landmark in the modified image of the target face and a corresponding landmark in an image of a neutral face. For example, the comparison module 530 may cause the processor 502 to determine a difference in the positions of the landmark and corresponding landmark, a difference in distance relative to another landmark and another corresponding landmark respectively, or the like.

The reference module 510 may also cause the processor 502 to determine a second distance based on the image of the neutral face or the modified image of the target face. For example, the reference module 510 may cause the processor 502 to determine the second distance based on locations of particular points in the modified image of the target face or based on locations of particular points in the image of the neutral face. The computer-readable medium 500 may include an expression module 540. The expression module 540 may cause the processor 502 to determine an expression of the target face based on the difference relative to the second distance. For example, the expression module 540 may cause the processor 502 to evaluate the difference in the context of the second difference. The expression module 540 may cause the processor 502 to determine the expression based on the difference by itself or in combination with other differences. In an example, when executed by the processor 502, the reference module 510 may realize the alignment engine 205 or the comparison engine 220 of FIG. 2, the modification module 520 may realize the alignment engine 205, the comparison module 530 may realize the comparison engine 220, or the expression module 540 may realize the action engine 230 or the expression engine 240.

Figure 6:
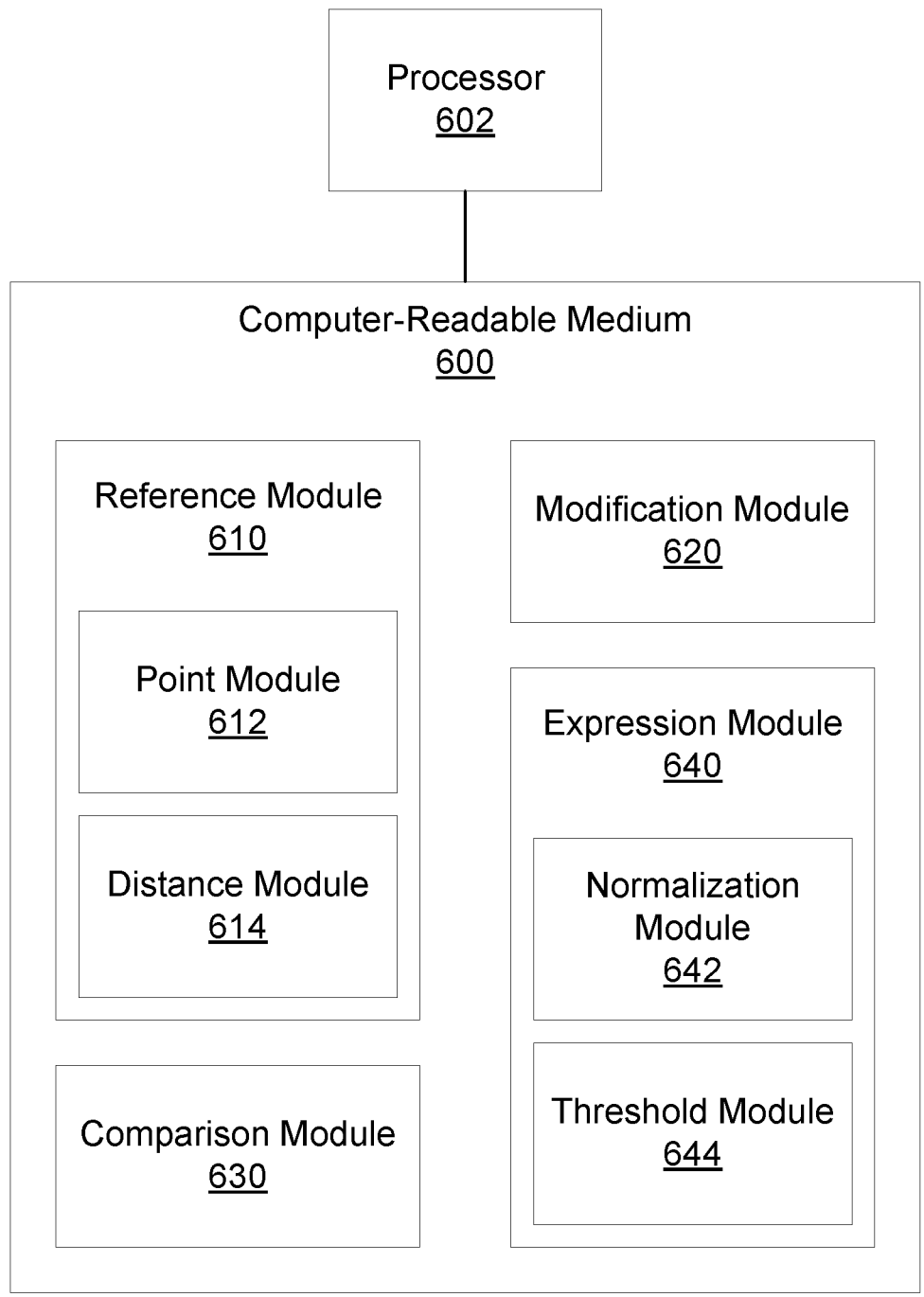
FIG. 6 is a block diagram of another example computer-readable medium including instructions that cause a processor to determine whether a facial action unit has occurred.

FIG. 6 is a block diagram of another example computer-readable medium 600 including instructions that, when executed by a processor 602, cause the processor 602 determine whether a facial action unit has occurred. The computer-readable medium 600 may include a reference module 610. The reference module 610 may cause the processor 602 to determine a first distance in an image of a target face. In some example, the first distance may be a distance between eye centers, a vertical distance between the eye centers and a landmark on the chin (e.g., LM 9), or the like. The reference module 610 may also cause the processor 602 to determine a second distance based on the image of the neutral face or the modified image of the target face. In some examples, the second distance may be equal to the first distance, may be a distance between landmarks at outer edges of the eyes of the target face or the neutral face, or the like.

The reference module 610 may include a point module 612. The point module 612 may cause the processor 602 to determine the locations of points usable to determine the distance. For example, the point module 612 may cause the processor 602 to determine the locations of landmarks in the image of the target face or in the image of the neutral face. The point module 612 may cause the processor 602 to average a plurality of landmarks around an eye to determine an eye center for that eye. The reference module 610 may also include a distance module 614. The distance module 614 may cause the processor 602 to compute the distance based on the points determined by the point module 612. For example, the point module 612 may cause the processor 602 to determine the cartesian coordinates of the points, and the distance module 614 may cause the processor 602 to compute the Euclidean distance between the points, the distance between the points along one axis, or the like.

The computer-readable medium 600 may include a modification module 620. The modification module 620 may cause the processor 602 to modify the image of the target face based on the first distance to create a modified image of the target face. For example, the modification module 620 may cause the processor 602 to modify the image of the target face to have the same face size, face alignment, number of pixels, or the like as the image of the neutral face. The modification module 620 may cause the processor 602 to determine based on the first distance how much to resize the image to match the image of the neutral face. The modification module 620 may cause the processor 602 to compare the first distance to a distance between corresponding points in the image of the neutral face, to compare the first distance to a predetermined value, or the like to determine a scaling factor for resizing the image.

The computer-readable medium 600 may include a comparison module 630. The comparison module 630 may cause the processor 602 to determine a difference between a landmark in the modified image of the target face and a corresponding landmark in an image of a neutral face. As previously discussed, particular landmarks may move when a facial action unit occurs. Accordingly, the comparison engine 630 may cause the processor 602 to determine the difference for a landmark associated with a facial action unit. In some examples, the comparison engine 630 may cause the processor 602 to detect a Euclidean distance between the position of the landmark in the image of the target face and the position of the landmark in the image of the neutral face, an arithmetic difference between a first Euclidean distance between a pair of landmarks (including the selected landmark) in the image of the target face and a second Euclidean distance between a pair of landmarks (including the corresponding landmark) in the image of the neutral face, or the like.

The computer-readable medium 600 may include an expression module 640. The expression module 640 may cause the processor 602 to determine an expression of the target face based on the difference relative to the second distance. In an example, the expression module 640 may include a normalization module 642. The normalization module 642 may cause the processor 602 to normalize the difference by the second distance. For example, the normalization module 642 may cause the processor 602 to divide the difference by the second distance to normalize the difference.

In the illustrated example, the expression module 640 includes a threshold module 644. The threshold module 644 may cause the processor 602 to determine whether a facial action unit occurred based on whether the difference normalized by the second distance exceeds a threshold. For example, the threshold module 644 may cause the processor 602 to determine whether the normalized difference is greater than or at least the threshold. In some examples, the threshold module 644 may cause the processor 602 to determine whether the normalized difference is less than or no more than the threshold. The threshold module 644 may cause the processor 602 to determine the facial action unit occurred based on the threshold being exceed or based on the threshold not being exceeded. The threshold module 644 may cause the processor 602 to determine whether the facial action unit occurred by comparing a plurality of differences to a plurality of thresholds. In some examples, the expression module 640 may not include a threshold module 644. For example, the expression module 640 may cause the processor 602 to determine the expression by providing the difference to a machine-learning model without applying a threshold to the difference. Referring to FIG. 2, in an example, when executed by the processor 602, the reference module 610 or the point module 612 may realize the alignment engine 205, the landmark engine 210, or the comparison engine 220, the distance module 614 may realize the alignment engine 205 or the comparison engine 220, the modification module 620 may realize the alignment engine 205, the comparison module 530 may realize the comparison engine 220, or the expression module 540, the normalization module 642, or the threshold module 644 may realize the action engine 230 or the expression engine 240.

The above description is illustrative of various principles and implementations of the present disclosure. Numerous variations and modifications to the examples described herein are envisioned. Accordingly, the scope of the present application should be determined only by the following claims.

What is claimed is:

1. A system comprising:
    a landmark engine to determine a facial landmark for an image of a face;
    a comparison engine to determine a difference between the facial landmark for the image and a facial landmark of a neutral face; and
    an action engine to determine whether a facial action unit occurred based on whether the difference satisfies a condition,
    wherein the action engine includes a machine-learning model to determine at least one of an emotion, an amount of pain, a mental condition, or a truthfulness of the target face based on the difference.

2. The system of claim 1, further comprising an alignment engine to generate the image of the face by cropping an initial image of the face, wherein the alignment engine is to select a size and an alignment of the face in the image based on a size and an alignment of the neutral face.

3. The system of claim 1, wherein the action engine is to determine whether each of a plurality of facial action units occurred, and further comprising an expression engine to determine an emotion of the face based on whether the plurality of facial action units occurred.

4. The system of claim 1, wherein the difference is a relative difference, and wherein the comparison engine is to determine the relative difference based on a raw difference and a reference distance from the neutral face or the face.

5. A method, comprising:
    capturing an image of a target face;
    selecting an image of a neutral face corresponding to the target face;
    determining a plurality of facial landmarks in the image of the target face and a plurality of facial landmarks in the image of the neutral face;
    selecting a facial action unit;
    determining a difference between a selected landmark from the plurality of facial landmarks in the image of the target face and a corresponding landmark from the plurality of landmarks in the image of the neutral face, wherein movement of the selected landmark is associated with the facial action unit;
    determining that the facial action unit occurred based on the difference satisfying a condition, and
    determining an expression of the target face based on the determining that the facial action unit occurred,
        wherein determining the expression of the target face comprises determining at least one of an emotion, an amount of pain, a mental condition, or a truthfulness of the target face.

6. The method of claim 5, further comprising detecting the target face in the image of the target face, wherein determining the plurality of facial landmarks in the image of the target face comprises determining the plurality of facial landmarks based on the detecting of the target face.

7. The method of claim 5, wherein determining the facial action unit occurred comprises determining the difference exceeds a threshold.

8. A non-transitory computer-readable medium comprising instructions that, when executed by a processor, cause the processor to:
- determine a first distance in an image of a target face;
- modify the image of the target face based on the first distance to create a modified image of the target face;
- determine a difference between a landmark in the modified image of the target face and a corresponding landmark in an image of a neutral face;
- determine a second distance based on the image of the neutral face or the modified image of the target face; and
- determine an expression of the target face based on the difference relative to the second distance,
  - wherein determining the expression of the target face comprises determining at least one of an emotion, an amount of pain, a mental condition, or a truthfulness of the target face.

9. The computer-readable medium of claim 8, the instructions to cause the processor to determine the expression include instructions to cause the processor to determine whether a facial action unit occurred based on whether the difference normalized by the second distance exceeds a threshold.

10. The computer-readable medium of claim 8, wherein the first distance equals the second distance.

11. The computer-readable medium of claim 8, wherein the instructions cause the processor to determine the first distance based on a distance between eye centers and to determine the second distance based on landmarks at outer edges of eyes.

12. The computer-readable medium of claim 11, wherein the instructions to cause the processor to determine the distance between the eye centers include instructions to cause the processor to determine a plurality of landmarks around an eye and average the plurality of landmarks to determine an eye center for the eye.

* * * * *